(12) United States Patent
Chen et al.

(10) Patent No.: US 11,579,933 B2
(45) Date of Patent: Feb. 14, 2023

(54) METHOD FOR ESTABLISHING SYSTEM RESOURCE PREDICTION AND RESOURCE MANAGEMENT MODEL THROUGH MULTI-LAYER CORRELATIONS

(71) Applicant: ProphetStor Data Services, Inc., Taichung (TW)

(72) Inventors: Wen-Shyen Chen, Taichung (TW); Wan-Chi Chang, Taichung (TW)

(73) Assignee: ProphetStor Data Services, Inc., Taichung (TW)

( * ) Notice: Subject to any disclaimer, the term of this patent is extended or adjusted under 35 U.S.C. 154(b) by 424 days.

(21) Appl. No.: 16/853,997

(22) Filed: Apr. 21, 2020

(65) Prior Publication Data

US 2021/0255899 A1 Aug. 19, 2021

(30) Foreign Application Priority Data

Feb. 19, 2020 (TW) .................. 109105383

(51) Int. Cl.
*G06F 9/50* (2006.01)
*G06N 3/08* (2023.01)
*G06N 3/04* (2023.01)

(52) U.S. Cl.
CPC .............. *G06F 9/505* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2008/0244601 A1* | 10/2008 | Zeis | G06F 11/1458 714/E11.197 |
| 2012/0254882 A1* | 10/2012 | Makljenovic | G06F 9/54 718/103 |
| 2013/0024868 A1* | 1/2013 | Jeong | G06F 9/505 718/104 |
| 2013/0111592 A1* | 5/2013 | Zhu | G06F 21/577 726/25 |
| 2017/0212930 A1* | 7/2017 | Carter | G06F 16/9024 |
| 2017/0344393 A1* | 11/2017 | Ansari | G06F 9/5083 |
| 2018/0129759 A1* | 5/2018 | Esterkin | G06F 11/3447 |
| 2019/0213099 A1* | 7/2019 | Schmidt | G06F 11/3006 |
| 2020/0082316 A1* | 3/2020 | Megahed | G06N 7/00 |
| 2020/0104174 A1* | 4/2020 | Vlcek | G06F 9/5011 |
| 2020/0174844 A1* | 6/2020 | Bergsma | G06F 9/5077 |

(Continued)

*Primary Examiner* — Adam Lee
(74) *Attorney, Agent, or Firm* — Demian K. Jackson; Jackson IPG PLLC

(57) ABSTRACT

A method for establishing system resource prediction and resource management model through multi-layer correlations is provided. The method builds an estimation model by analyzing the relationship between a main application workload, resource usage of the main application, and resource usage of sub-application resources and prepares in advance the specific resources to meet future requirements. This multi-layer analysis, prediction, and management method is different from the prior arts, which only focus on single-level estimation and resource deployment. The present invention can utilize more interactive relationships at different layers to effectively perform predictions, thereby achieving the advantage of reducing hidden resource management costs when operating application services.

13 Claims, 7 Drawing Sheets

(56) References Cited

U.S. PATENT DOCUMENTS

2020/0218571 A1\*  7/2020  Chen ..................... G06F 9/5027
2020/0380351 A1\* 12/2020  Verma .................... G06N 3/04
2021/0096981 A1\*  4/2021  Desikachari ........... G06F 9/466
2021/0182108 A1\*  6/2021  Eberlein ............... G06F 9/4881

\* cited by examiner in a plurality of nodes where a main application is deployed, regularly collecting workloads of the main application and usage amounts of every resource in the plurality of nodes used by the main application and a plurality of sub-applications thereof, synchronously calculating first correlation values of the usage amount of each resource of the main application pertaining to the workload of the main application and second correlation values of the usage amount of each resource of each sub-application pertaining to the usage amount of each resource of the main application (S01)

↓ predicting the workload of the main application at time point T+1 in the future by a time series model at time point T, and finding out the resource with corresponding first correlation value higher than a first threshold value (S02)

↓ creating a usage amount predictive model to predict usage amounts of every resource of the main application at each time points after time point T with usage amounts of every resource of the main application collected before time point T, and inputting the predicted workload of the main application at time point T+1 into the usage amount predictive model to obtain an predicted increment of the usage amount of the resource of the main application found in the previous step at time point T+1 (S03)

↓ adding at least one node to the main application at time point T+1 (S04)

Fig. 2

|  | t=3 seconds | t=4 seconds | t=5 seconds | Δ(t3~t4) | Δ(t4~t5) |
| --- | --- | --- | --- | --- | --- |
| workload (Gb/s) | 8.3 | 9 | 9.5 | 0.7 | 0.5 |
| usage amount of CPU core (number) | 6.2 | 6.3 | 5.8 | 0.1 | -0.5 |
| usage amount of memory (GB) | 3.3 | 5.3 | 7.9 | 2 | 2.6 |
| similarity measurement value between usage amount of CPU core and workloads of the main application | -0.41 | | | | |
| similarity measurement value between usage amount of memory and workloads of the main application | 0.96 | | | | |

Fig. 3 in a plurality of nodes where a main application is deployed, regularly collecting workloads of the main application and usage amounts of every resource in the plurality of nodes used by the main application and a plurality of sub-applications thereof, and synchronously calculating first correlation values of the usage amount of each resource of the main application pertaining to the workload of the main application and second correlation values of the usage amount of each resource of each sub-application pertaining to the usage amount of each resource of the main application (S01)

↓ predicting the workload of the main application at time point T+1 in the future by a time series model at time point T, and finding out the resource with corresponding first correlation value higher than a first threshold value (S02)

↓ finding out corresponding sub-applications and sub-application related resources with corresponding second correlation value higher than a second threshold value, and calculating ratios of said sub-applications relative to the main application in using the sub-application related resource (S021)

↓ creating a usage amount predictive model to predict usage amounts of every resource of the main application at each time points after time point T with usage amounts of every resource of the main application collected before time point T, and inputting the predicted workload of the main application at time point T+1 into the usage amount predictive model to obtain an predicted increment of the usage amount of the resource of the main application found in the previous step at time point T+1 (S03)

↓ adding at least one node to the main application at time point T+1 (S04)

↓ assigning usable amounts of the sub-application related resource in the at least one node to the corresponding sub-application according to the corresponding ratio at time point T+1 (S041)

Fig. 4

| usage amount | main application CPU core | main application memory | first sub-application CPU core | first sub-application memory | second sub-application CPU core | second sub-application memory | third sub-application CPU core | third sub-application memory |
|---|---|---|---|---|---|---|---|---|
| main application CPU core | 1 | 0.49 | 0.98 | -0.38 | 1 | 0.22 | -0.97 | 0.87 |
| main application memory | 0.49 | 1 | 0.66 | -0.99 | 0.41 | 0.96 | -0.68 | 0.86 |
| first sub-application CPU core | 0.98 | 0.66 | 1 | -0.56 | 0.96 | 0.41 | -1 | 0.95 |
| first sub-application memory | -0.38 | -0.99 | -0.56 | 1 | -0.29 | -0.99 | 0.58 | -0.78 |
| second sub-application CPU core | 1 | 0.41 | 0.96 | -0.29 | 1 | 0.13 | -0.95 | 0.82 |
| second sub-application memory | 0.22 | 0.96 | 0.41 | -0.99 | 0.13 | 1 | -0.44 | 0.67 |
| third sub-application CPU core | -0.97 | -0.68 | -1 | 0.58 | -0.95 | -0.44 | 1 | -0.96 |
| third sub-application memory | 0.87 | 0.86 | 0.95 | -0.78 | 0.82 | 0.67 | -0.96 | 1 |

Fig. 5

| | second correlation value | ratio | importance of weight |
|---|---|---|---|
| usage amount of CPU core of main application | 0.74 | - | |
| usage amount of memory of main application | 0.76 | - | |
| usage amount of CPU core of first sub-application | 0.82 | 0.47 | 0.64 |
| usage amount of memory of first sub-application | 0.70 | 0.01 | 0.35 |
| usage amount of CPU core of second sub-application | 0.70 | 0.22 | 0.46 |
| usage amount of memory of second sub-application | 0.60 | 0.59 | 0.60 |
| usage amount of CPU core of third sub-application | 0.82 | 0.31 | 0.57 |
| usage amount of memory of third sub-application | 0.86 | 0.4 | 0.63 |

Fig. 6 in a node where a main application is deployed, regularly collecting workloads of the main application and usage amounts of every resource in the node used by the main application and a plurality of sub-applications thereof (S11)

↓ at time point T, predicting the workload of the main application at time point T+1 in the future with a time series model, and calculating ratios of each sub-application relative to the main application in using each resource in the node (S12)

↓ creating a predictive model to calculate usage amounts of every resource of the main application at every time point after time point T with usage amounts of every resource of the main application collected before time point T, and inputting the predicting workload of the main application at time point T+1 into the predictive model to obtain predicted usage amounts of every resource of the main application at T+1_time point (S13)

↓ assigning the predicted usage amounts of every resource of the main application to each sub-application according to the corresponding ratio at time point T+1 (S14)

Fig. 7

METHOD FOR ESTABLISHING SYSTEM RESOURCE PREDICTION AND RESOURCE MANAGEMENT MODEL THROUGH MULTI-LAYER CORRELATIONS

FIELD OF THE INVENTION

The present invention relates to a method for establishing system resource requirement prediction and resource management model. More particularly, the present invention relates to a method for establishing system resource requirement prediction and resource management model through multi-layer correlations, capable of effectively predicting changes in application workloads and appropriately deploy resources at future time points to meet the needs of application operations.

BACKGROUND OF THE INVENTION

Today, enterprises deploy their applications in complex environments, such as cloud, local, and edge computing. However, because the architectures of the cloud, on-premise, or edge computing system are different, it will cause difficulties in resource management and maintenance. Information Technology (IT) system managers need to learn how to manage and maintain systems in different environments. When some applications are damaged, IT system managers spend more time on debugging due to complex system management and maintenance methods. It can be seen that complex system management and maintenance methods will increase the cost of system maintenance, for example, the cost of compatibility and integration of data that must be transferred between different systems, the cost of backup settings required by the data based on how the system is configured, the system maintenance costs caused by different security rule settings for various systems, and other hidden resources management costs. There are two management schemes, proactive management scheme, and reactive management scheme. The proactive management scheme is to predict what problems may occur in the system before the system has any issue and provide an early warning; the reactive management scheme is when the system has an issue, it starts to find a feasible solution. A proactive management scheme usually requires experienced IT system managers to judge the possible future situation based on the analysis on past experiences. However, for enterprises, IT system management managers who are proficient in different system architectures such as cloud, local and edge computing, and have extensive experience are not easy to find. Therefore, to solve the system problems as mentioned above caused by application damage, most enterprises often adopt a reactive management scheme, or only a simple proactive management scheme, such as implementing only daily data backup. For reactive management schemes, only when system problems occur, IT system managers start to study how to deal with system problems. However, for some extreme situations, such as the Enterprise Resource Planning (ERP) system, the amount of data processed by the system suddenly increases because the company's business is expanding too fast. The memory resources are insufficient to cope with the amount of data processed by the system, making the system unable to function correctly. If only a reactive management scheme or a simple proactive management scheme is used, the system must be suspended to restore data. The operating loss caused by the suspension of the system is huge and difficult to measure. Therefore, IT system managers in related industries have done their best to research and design effective proactive management schemes.

Further, the deployed applications can be divided into a main application and a sub-application under the main application according to their subordinate dependencies. Taking the aforementioned ERP system as an example, it usually includes sub-applications such as Hypertext Transfer Protocol (HTTP) server, messaging system, database system and search engine. Each sub-application can be directly installed and deployed on the nodes in the cluster and deployed as a Virtual Machine or Container, for example, using a Container management system such as Kubernetes to install on the nodes in the cluster. Each sub-application needs to communicate with other sub-applications. IT system managers usually manage the usable amounts of Central Processing Units (CPU), memories, etc. of the main application and sub-application through a monitoring management system. For example, if the memory resource of the main application is insufficient, IT system managers increase the memory resource of the entire system; if a sub-application has insufficient memory resource, IT system managers only adjust the settings of the sub-application to increase the usable amount of the memory resource for the sub-application. IT system managers can monitor each sub-application through the management interface settings of the monitoring management system to monitor and manage the information of each sub-application, and then monitor and manage the main application. It can collect data when the main application is running for judging or deciding to adjust related hardware to meet user needs. For example, add three HTTP server replicas to the HTTP server sub-application, reduce the memory of the database system sub-application 10G, and even add a node in response to a sudden large amount of demand, for instance, adding a unit of container to deploy the ERP system (main application). When the workload of the main application, namely, the amount of information requested by the user, changes with time, each sub-application's resources (such as CPU, memory, network workloads, etc.) will also change to meet the performance requirements of the main application. However, the common method of predicting the resource utilization of the main application is to predict the resource utilization of each sub-application separately and add them up to get the resource utilization of the main application. Such an approach will cause the system to generate extra-large amounts of calculating resources to be wasted in predicting. Therefore, to reduce the computing cost of predicting resources, most resource management schemes only display and collect real-time resource utilization and do simple analysis only for single sub-application. This makes many of the needs for resources in the future can only be judged by the experience of IT system managers. As a result, when errors occur, inexperienced IT system managers spend a lot of time debugging (tracking related logs) and finding the root cause. This is why the reactive management scheme causes high hidden costs.

In contrast to the reactive management scheme, some proactive management schemes have recently been proposed to solve the problems as mentioned above. Most proactive management schemes aim at the resource demand estimation and resource provision of single sub-application and will not be based on multi-level management such as workloads and resource usage amounts of main application, not to mention the need for resources from the influence of correlations of sub-applications. If the interactive relationship between each layer is analyzed from the foregoing multi-layered perspective, the prediction of demand on the time point in the future can be effectively carried out through the relationship between them to obtain the best system resource prediction and resource management, and reduce hidden costs. This is also the reason why the present invention initiated.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requirement above, a method for establishing system resource requirement prediction and resource management model through multi-layer correlations is disclosed. The method comprises the steps of: A) in a node where the main application is deployed, regularly collecting workloads of the main application and usage amounts of every resource in the node used by the main application and a plurality of sub-applications thereof; B) at time point T, predicting the workload of the main application at time point T+1 in the future with a time series model, and calculating ratios of each sub-application relative to the main application in using each resource in the node; C) creating a predictive model to calculate usage amounts of every resource of the main application at every time point after time point T with usage amounts of every resource of the main application collected before time point T, and inputting the predicting workload of the main application at time point T+1 into the predictive model to obtain predicted usage amounts of every resource of the main application at T+1 time point; and D) assigning the predicted usage amounts of every resource of the main application to each sub-application according to the corresponding ratio at time point T+1.

Another method for establishing system resource prediction and resource management model through multi-layer correlations is also disclosed in the present invention. The method comprises the steps of: a) in a plurality of nodes where a main application is deployed, regularly collecting workloads of the main application and usage amounts of every resource in the plurality of nodes used by the main application and a plurality of sub-applications thereof, and synchronously calculating first correlation values of the usage amount of each resource of the main application pertaining to the workload of the main application and second correlation values of the usage amount of each resource of each sub-application related to the usage amount of each resource of the main application; b) predicting the workload of the main application at time point T+1 in the future by a time series model at time point T, and finding out the resource with corresponding first correlation value higher than a first threshold value; and c) creating a usage amount predictive model to predict usage amounts of every resource of the main application at each time points after time point T with usage amounts of every resource of the main application collected before time point T, and inputting the predicted workload of the main application at time point T+1 into the usage amount predictive model to obtain a predicted increment of the usage amount of the resource of the main application found in the previous step at time point T+1.

The method may further comprise a step after the step c): d) adding at least one node to the main application at time point T+1.

The method may also further comprise a step of b1) after the step b) and a step of d1) after the step d): b1) finding out corresponding sub-applications and sub-application related resources with corresponding second correlation value higher than a second threshold value, and calculating ratios of said sub-applications relative to the main application in using the sub-application related resource; and d1) assigning usable amounts of the sub-application related resource in the at least one node to the corresponding sub-application according to the corresponding ratio at time point T+1.

Preferably, the first threshold value is 0.5. The second threshold value is also 0.5.

In one embodiment, a calculating method of the first correlation value is calculating similarity measurement values with collected usage amounts of every resource of the main application and workloads of the main application, wherein when the similarity measurement value is negative, take an absolute value thereof. The similarity measurement value is obtained by calculating a cosine value from vectors formed by two change values of usage amounts of one single resource of the main application in three successive collecting time points and formed by two change values of workloads of the main application in three successive collecting time points.

In one embodiment, a calculating method of the second correlation value comprises the steps of: calculating similarity measurement value between the usage amount of one single resource the main application and that of any sub-application, similarity measurement value between usage amounts of any two resources of the main application, and similarity measurement value between usage amounts of any two sub-application resources with collected usage amounts of every resource of the main application and usage amounts of every resource of the sub-applications, wherein if the similarity measurement values are negative, take an absolute value thereof, and the similarity measurement value between usage amounts of the single resource of the main application or that of sub-application is 1; and averaging the similarity measurement values of the usage amounts of the single resource of the main application or that of the single sub-application. The similarity measurement value is obtained by calculating a cosine value from vectors formed by two change values of usage amounts of the single resource of the main application in three successive collecting time points and formed by two change values of usage amounts of the single resource of any application in three successive collecting time points, vectors formed by two change values of usage amounts of any two resources of the main application in three successive collecting time points, or vectors formed by two change values of usage amounts of the single resource of any two applications in three successive collecting time points.

Preferably, the usage amount predictive model uses a machine-learning algorithm to analyze usage amounts of every resource of the main application collected before time point T to predict usage amounts of every resource of the main application at every time point after time point T. The machine learning algorithm may be a Regression Analysis algorithm, Bayesian Belief Network algorithm, Density-Based Spatial Clustering of Applications with Noise (DB-SCAN) algorithm, Q-learning algorithm, or Poly Regression algorithm.

The method may further comprises a step of c1) after the step c) and a step of d2) after the step d1): c1) calculating an importance of weight for each sub-application regarding each sub-application related resource at time point T+1; and d2) if the assigned usable amount of the sub-application related resource in the at least one node at time point T+1 is not able to meet the need for the related sub-application, prioritize the need for the sub-application related resource for the sub-application with a larger importance of weight. The importance of weight is an average value of the second correlation value of any sub-application and the ratio of the sub-application relative to the main application in using the sub-application related resource at time point T.

Preferably, the time series model may be Autoregressive Integrated Moving Average (ARIMA) model. The resource is the number of available CPU cores, usable memory, usable storage, or usable network bandwidth.

The method of the present invention creates a predictive model by analyzing the relations among workloads of the main application, usage amounts of every resource of the main application and usage amounts of every resource of the sub-application, then pre-deploy specific resources at future time points to meet user needs. This multi-level analysis, predicting, and managing method is different from existing technologies that focus on estimating and deploying resources at individual levels. The present invention can utilize more interactive relationships between layers to effectively predict, thereby achieving the advantage of reducing the hidden cost of operation of the application service.

BRIEF DESCRIPTION OF THE DRAWINGS

FIG. 2 is a flow chart of the method for establishing a system resource prediction and resource management model through multi-layer correlations.

FIG. 3 is a calculating table of similarity measurement values between usage amounts of two resources of the main application and workloads of the main application.

FIG. 4 is another flow chart of the method for establishing a system resource prediction and resource management model through multi-layer correlations.

FIG. 5 shows calculating results of similarity measurement value in an example of matrix table.

FIG. 6 shows calculating results of the second correlation values, ratios and import weights.

FIG. 7 is still another flow chart of the method for establishing system resource prediction and resource management model through multi-layer correlations.

DETAILED DESCRIPTION OF THE PREFERRED EMBODIMENTS

Figure 1:
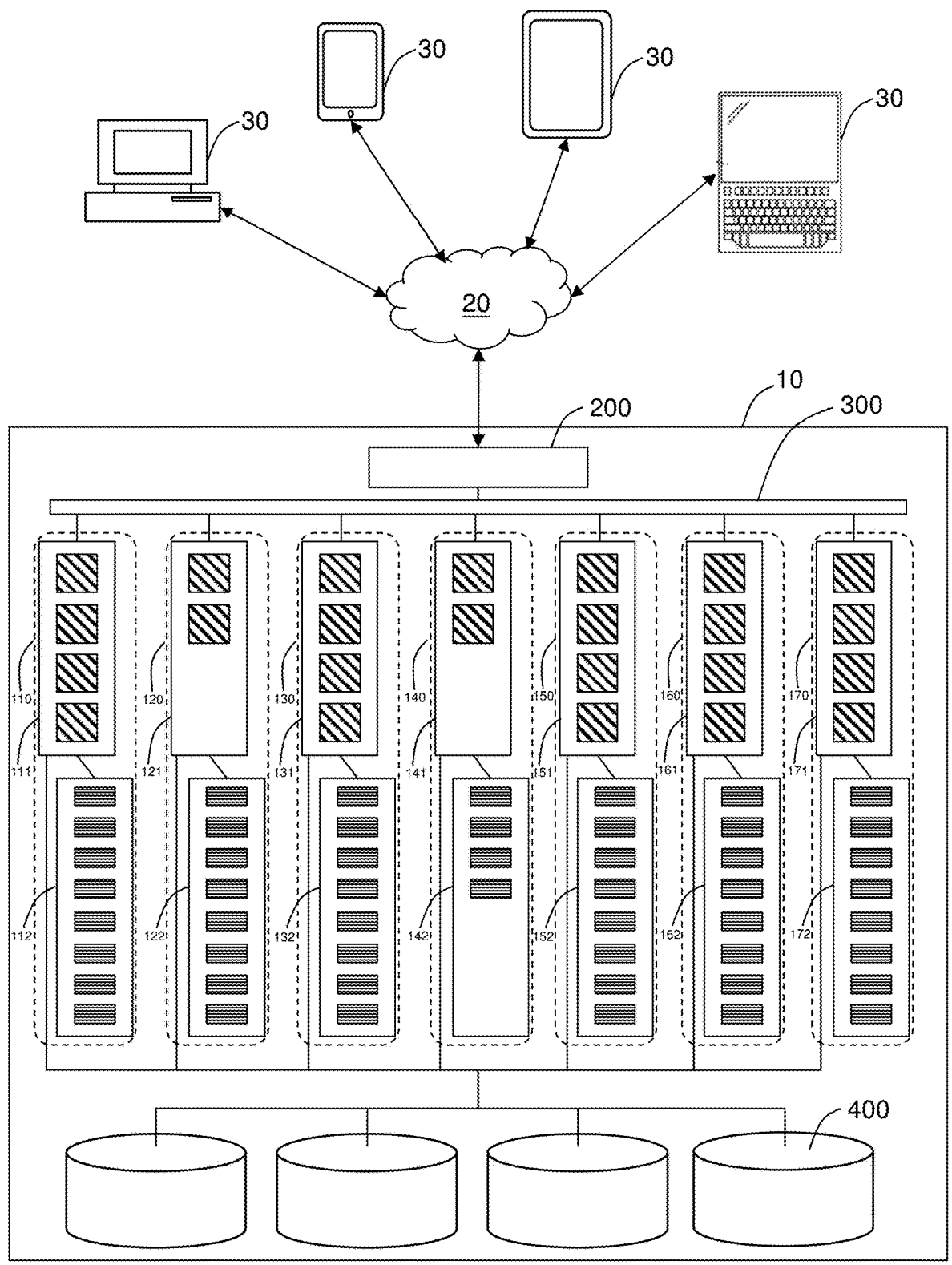
FIG. 1 is a schematic diagram of the implemented hardware architecture of the method for establishing system resource prediction and resource management model through multi-layer correlations.

The technical solutions in the embodiments of the present invention will be clearly and completely described concerning the drawings in the embodiments of the present invention. Obviously, the described embodiments are only a part of the embodiments of the present invention, but not all the embodiments. Based on the embodiments of the present invention, all other embodiments obtained by those skilled in the art without any creative labor belong to the protection scope of the present invention.

Please see FIG. 1. It is a schematic diagram of the implemented hardware architecture of the method for establishing system resource prediction and resource management model through multi-layer correlations. According to the present invention, the method is applied for a computer cluster 10, used for resource prediction and resource management of the main application installed on computer cluster 10, reducing the risks and hidden costs of the main application in the face of hardware system damage. In the present embodiment, the computer cluster 10 is a server or a cluster architecture assembled by a number of servers. Its architecture can be x86, RISC or ARM compliant. In the computer cluster 10, different nodes can be formed by software simulation or hardware design, in the present embodiment. Nodes are used to install containers. Under the planning of system software, a node can occupy a certain amount of hardware or resources of workloads without interference from other nodes. Each container is a node and installed one or a number of sub-applications deployed by a container system architecture such as Kubernetes. Sub-applications are a collection of software for the main application to perform specific services. As explained earlier, it is not repeated. There are seven nodes (a first node 110, a second node 120, a third node 130, a fourth node 140, a fifth node 150, a sixth node 160, and a seventh node 170, indicated by a dashed frame) in the present embodiment. Each node is assigned with a CPU core group and a memory group. The former contains more than one CPU core, which is represented by a diagonal line frame; the latter contains more than one memory unit, which is represented by a horizontal line frame. To simplify the description, it is assumed that the specifications of the hardware of the servers are the same, and specifications of the CPU and memory in multiple container nodes are also the same. Multiple container nodes share the CPU and memory of a server based on node resource requirements.

To complete the specific steps proposed by the method, it relies on the application software installed on the first node 110. In the present embodiment, the codes and data of the application software are stored in a disk array 400 of the computer cluster 10. When a first CPU core group 111 in the first node 110 calls the codes and data in the disk array 400 to operate under the instruction of the operating system, These codes and data, together with related data collected externally, will be temporarily stored in a first memory group 112. If the first node 110 wants to collect data externally (from other nodes), it can be done through a network switch 300. The second node 120, the third node 130, and the fourth node 140 are provisioned for installation and operation for a first sub-application, a second sub-application, and a third sub-application of the main application, respectively. The chance that each of the aforementioned sub-applications will be used at the same time is uncertain, and the amount of resources it occupies by default is also different. For example, the first sub-application requires a small amount of computation but has a large amount of queue data, then a second CPU core group 121 of the second node 120 uses 2 CPU cores and a second memory group 122 of the second node 120 uses 8 memory units; the second sub-application requires a large amount of computation and has a large amount of queue data, then a third CPU core group 131 of the third node 130 uses 4 CPU cores and a third memory group 132 of the third node 130 uses 8 memory units; the second sub-application requires a small amount of computation and has a small amount of queue data, then a fourth CPU core group 141 of the fourth node 140 uses 2 CPU cores and a fourth memory group 142 of the fourth node 140 uses 4 memory units. When an external client device 30 (may be a notebook, a tablet, a desktop computer, or a smartphone) needs to use the service of one sub-application, the data connection can access a network router 200 through a network 20. The client device 30 further interacts with the responding node and sends and receives data through a network switch 300. A fifth node 150 including a fifth CPU core group 151 and a fifth memory group 152, a sixth node 160 including a sixth CPU core group 161 and a sixth memory group 162, and a seventh node 170 including a seventh CPU core group 171 and a seventh memory group 172 in FIG. 1 are used as backups. They will be used with the description of the embodiment. It is not detailed here. But for convenience, usable amounts of resources of the nodes are all fixed (4 CPU cores and 8 memory units). In practice, nodes designed with quantitative resources may not be used.

Please see FIG. 2. It is a flow chart of the method. A first of the method is in a plurality of nodes where the main application is deployed, regularly collecting workloads of the main application and usage amounts of every resource in the plurality of nodes used by the main application and a plurality of sub-applications thereof, and synchronously calculating first correlation values of the usage amount of each resource of the main application pertaining to the workload of the main application and second correlation values of the usage amount of each resource of each sub-application pertaining to the usage amount of each resource of the main application (S01). As mentioned above, three sub-applications of the main application are deployed in the second node 120, the third node 130 and the fourth node 140. The application software in the first node 110 can collect workloads on the sub-applications in these nodes at certain intervals, such as 5 seconds, 30 seconds, one minute, etc., obtaining workloads of the main application; it can also be known that the usage amounts of each resource in these nodes used by the sub-application use, further knowing the usage amount of each resource of the main application. It should be explained here that workload is an objective criterion for measuring the occupation of resources by the main application. The definition of workload is the number of request messages sent by the user to the entire cluster system per unit time. In addition, the resource mentioned in the present invention refers to the usable amount of hardware that each node or sub-application can use. As mentioned earlier, it is the number of usable CPU cores and usable memory. In the present embodiment, storages in the disk array 400 are not under the control of the node or the sub-application, however, in other embodiment, usable storages may be set as a resource. Similarly, usable network bandwidth assigned to each node or sub-application by the network router 200 may also be a kind of resource.

At the same time, the application software of the first node 110 can simultaneously calculate the first correlation values of the usage amount of each resource of the main application pertaining to the workload of the main application and second correlation values of the usage amount of each resource of each sub-application pertaining to the usage amount of each resource of the main application according to the previously collected data. A calculating method of the first correlation value is calculating similarity measurement values with collected usage amounts of every resource of the main application and workloads of the main application, and when the similarity measurement value is negative, take an absolute value thereof. It should be noted that similarity measurement value is a measure of the degree of dependence between changes in two variables. It is usually presented as a data between −1 and 1. −1 means a completely negative correlation, 0 means no correlation, and 1 means a completely positive correlation. In order to simplify the analysis, the negative parts are turned into positive values, so that only the similarity measures between uncorrelated (0) to correlated (1) are present. Many existing statistical methods can be used to obtain similarity measurement values. However, considering the application of resource scheduling at the server level, the present invention adopts the following method: the similarity measurement value is obtained by calculating a cosine value from vectors formed by two change values of usage amounts of one single resource of the main application in three successive collecting time points and formed by two change values of workloads of the main application in three successive collecting time points. For example, please see FIG. 3. It is a calculating table of similarity measurement values between usage amounts of two resources of a main application and workloads of the main application. When the time point is 3 seconds, the collected workload of the main application is 8.3 Gb/s, the usage amount of CPU cores of the main application is 6.2, and the usage amount of memory of the main application is 3.3 GB. When the time point is 4 seconds, the collected workload of the main application is 9.0 Gb/s, the usage amount of CPU cores of the main application is 6.3, and the usage amount of memory of the main application is 5.3 GB. When the time point is 5 seconds, the collected workload of the main application is 9.5 Gb/s, the usage amount of CPU cores of the main application is 5.8, and the usage amount of memory of the main application is 7.9 GB. Between 3 and 4 seconds, increment of the workload is 0.7 Gb/s, increment of the usage amount of CPU core is 0.1, and increment of the usage amount of memory is 2 GB. Between 4 and 5 seconds, increment of the workload is 0.5 Gb/s, increment of the usage amount of CPU core −0.5, and increment of the usage amount of memory is 2.6 GB. Therefore, a vector formed by two change values of usage amounts of CPU core of the main application in three successive collecting time points is (0.1, −0.5). A vector formed by two change values of usage amounts of memory of the main application in three successive collecting time points (2, 2.6). A vector formed by two change values of workloads of the main application in three successive collecting time points is (0.7, 0.5). The formula of cosine is $$\frac{\vec{A} \cdot \vec{B}}{|A||B|}.$$

Hence, it can be obtained that the similarity measurement value between usage amount of CPU core and workloads of the main application is −0.41 and the similarity measurement value between usage amount of memory and workloads of the main application is 0.96. Since the former is negative, its absolute value becomes 0.41. Namely, After the workloads of the main application change, a change rate of the usage amount of memory will be very close to that of the workloads of the main application. A change rate of the usage amount of CPU cores will be much lower than that of the workloads of the main application.

Next, a second step of the method is predicting the workload of the main application at time point T+1 in the future by a time series model at time point T, and finding out the resource with corresponding first correlation value higher than a first threshold value (S02). Time point T is any point in time when prediction of workload of the main application deployment of resources begin for the next time point. In the present embodiment, take the 5 seconds as an example to illustrate. Time point T+1 does not specifically refer to a time point of 6 seconds, but refers to a specific time point in the future, such as a shorter time of 30 seconds, 20 minutes, one hour etc., even a longer time of 3 days, two weeks etc. Of course, if a prediction is required to be make after a longer time, the collection time in step S01 should be longer and the number should be larger. Here, time series model uses ARIMA model. The purpose of taking the first threshold value in this step is to filter resources that are more sensitive to changes in the workload of the main application so that in a limited hardware (node) environment, a resource with a high impact can be preferentially selected to change the configuration. In the present embodiment, the first threshold value is 0.5. With the description for calculating above, the resource found is a usable amount of memory. Of course, if a lot of hardware is not deployed, the first threshold value can be reduced, so that more types of resources are allowed to be adjusted at the next time point.

Next, a third step of the method is creating a usage amount predictive model to predict usage amounts of every resource of the main application at each time points after time point T with usage amounts of every resource of the main application collected before time point T, and inputting the predicted workload of the main application at time point T+1 into the usage amount predictive model to obtain a predicted increment of the usage amount of the resource of the main application found in the previous step at time point T+1 (S03). In this step, the usage amount predictive model uses a machine-learning algorithm to analyze usage amounts of every resource of the main application collected before time point T to predict usage amounts of every resource of the main application at every time point after time point T. Machine-learning algorithms that can build usage amount predictive model can be Regression Analysis algorithm, Bayesian Belief Network algorithm, Density-Based Spatial Clustering of Applications with Noise (DBSCAN) algorithm, Q-learning algorithm, Poly Regression algorithm, etc. Preferably, more than two machine learning algorithms can be used interactively to have a usage amount predictive model closer to the usage amounts of resources in the future. The usage amount predictive model mentioned in other embodiments in the following is also the same as that in this embodiment. Thus, the increment of the usage amount of memory can be deduced by the predicted workload of the main application at time point T+1.

Last, a fourth step of the method is adding at least one node to the main application at time point T+1 (S04). This step is to automatically add nodes without manual adjustment. The fifth CPU core group 151, and the fifth memory group 152 of the fifth node 150 can be assigned to the main application to use. As for the specific sub-application which is assigned, it is not limited here. However, the method can be carried out to the third step to let managers manually add nodes.

The previous embodiment only predicts the workloads of the main application and selects the resources that have more influence on the main application for node distribution. The following embodiment will further reveal how to allocate the resources of the nodes to sub-applications.

Please see FIG. 4. It is another flow chart of the method for establishing system resource prediction and resource management model through multi-layer correlations. Compared to FIG. 2, The method in this implementation has two additional steps: a step of S021 is comprised after the step S02, and a step of S041 is comprised after the step S04. The step S021 is finding out corresponding sub-applications and sub-application related resources with corresponding second correlation value higher than a second threshold value and calculating ratios of said sub-applications relative to the main application in using the sub-application related resource. The step S041 is The step S041 is assigning usable amounts of the sub-application related resource in the at least one node to the corresponding sub-application according to the corresponding ratio at time point T+1. Here, the sub-application related resource specifically refers to the resource used by the corresponding sub-application for the second correlation values higher than the second threshold value. The resources used by the sub-application may not always be higher than the second threshold value when calculating the second correlation values. If the calculated second correlation value of the usage amount of CPU cores of the sub-application is higher than the second threshold value while the calculated second correlation value of the usage amount of memory of the sub-application is smaller than the second threshold value, then the only usable amount of CPU core will be used to assign at time point T+1. In addition, the second correlation value has two steps to calculate: a first step is calculating similarity measurement value between the usage amount of one single resource the main application and that of any sub-application, similarity measurement value between usage amounts of any two resources of the main application, and similarity measurement value between usage amounts of any two sub-application resources with collected usage amounts of every resource of the main application and usage amounts of every resource of the sub-applications, wherein if the similarity measurement values are negative, take an absolute value thereof, and the similarity measurement value between usage amounts of the single resource of the main application or that of sub-application is 1. The second step is averaging the similarity measurement values of the usage amounts of the single resource of the main application or that of the single sub-application. As the calculation of the first correlation values, the similarity measurement value in the second correlation values is to calculate a cosine of two vectors. The two vectors are formed by two change values of usage amounts of the single resource of the main application in three successive collecting time points and formed by two change values of usage amounts of the single resource of any application in three successive collecting time points, formed by two change values of usage amounts of any two resources of the main application in three successive collecting time points, or formed by two change values of usage amounts of the single resource of any two applications in three successive collecting time points. The calculation process is omitted here. The calculation result of the similarity measurement values in an example is listed in FIG. 5 in a matrix table. Usage amounts of the specific resource for the same application in FIG. 5 have a value of 1 at the intersection because it is completely relevant. Overall, the matrix in FIG. 5 is a symmetric matrix. Take the third column (black dot background) as an example to illustrate the meaning of the values in the matrix. A similarity measurement value between the usage amount of memory of the main application and the usage amount of the CPU core of the main application is 0.49. A similarity measurement value between the usage amount of memory of the main application and itself is 1. A similarity measurement value between the usage amount of memory of the main application and the usage amount of the CPU core of the first sub-application is 0.66. A similarity measurement value between the usage amount of memory of the main application and the usage amount of memory of the first sub-application is −0.99 (0.99 after taking the absolute value). A similarity measurement value between the usage amount of memory of the main application and the usage amount of the CPU core of the second sub-application is 0.41. A similarity measurement value between the usage amount of memory of the main application and the usage amount of memory of the second sub-application is 0.96. A similarity measurement value between the usage amount of memory of the main application and the usage amount of the CPU core of the third sub-application is −0.68 (0.68 after taking the absolute value). A similarity measurement value between the usage amount of memory of the main application and the usage amount of memory of the third sub-application is 0.86. The result of averaging the similarity measurement values of usage amounts of single resources of the main application or single sub-applications are as follows (Please see FIG. 6): The second correlation value of the usage amount of CPU core of the main application is 0.74, the second correlation value of the usage amount of memory of the main application is 0.76, the second correlation value of the usage amount of CPU core of the first sub-application is 0.82, the second correlation value of the usage amount of memory of the first sub-application is 0.70, the second correlation value of the usage amount of CPU core of the second sub-application is 0.70, the second correlation value of the usage amount of memory of the second sub-application is 0.60, the second correlation value of the usage amount of CPU core of the third sub-application is 0.82, and the second correlation value of the usage amount of memory of the third sub-application is 0.86. Take the second threshold value of 0.5. Usage amounts of every resource of all applications meet the requirements of the first half of step S021, but the resources removed by step S02 must be eliminated.

The ratio in step S021 is to use data collected before time point T to find out a ratio representing the use of sub-application related resources of the sub-application relative to the main application, for example, the ratio of using the memory of the first sub-application relative to the main application. In this way, the sum of the ratios of every sub-application relative to the main application using a specific sub-application related resource will be 1. FIG. 6 shows ratios of each sub-application relative to the main application in using the specific sub-application related resource. The calculation of ratio can be the average of the calculation results at every collection time point. A larger value indicates that the usage amount of a particular sub-application related resource by the sub-application is also large.

The step S041 is to assign the resources in the node for each sub-application from the step S04 at time point T+1. If the usable amount of CPU core and the usable amount of memory in the step S02 are both resources with the first correlation values higher than a first threshold value, then the hardware of the fifth node 150, the sixth node 160 and the seventh node 170 in FIG. 1 can all be used to assign. From the usage amount of CPU cores, if the increment of the usage amount calculated from the step S03 is 2 nodes, 8 CPU cores of the fifth CPU core group 151 in the fifth node 150 and 8 CPU cores of the sixth CPU core group 161 in the sixth node 160 can be assigned to each sub-application at time point T+1 (the seventh CPU core group 171 in the seventh node 170 is reserved for the next time point). According to the data in FIG. 6, 3.76 CPU cores are assigned to the first sub-application. 1.76 CPU cores are assigned to the second sub-application. 2.48 CPU cores are assigned to the third sub-application. The same method can be applied to the assignment of the usage amount of memory. Of course, there is a simpler way for assigning: directly assign the number of resources that a replica of the sub-application assign needs. Namely, directly add one sub-application. Because the total amount of resources used by each sub-application may not be the total amount of resources in a node, it should be noticed before the assignment.

As mentioned above, the result of various assignments of resources is generated when the resources are sufficient. When the number of reserved nodes is not sufficient, or the resources in the node assigned to the main application can not fulfill the requirement of a specific sub-application, a mechanism to determine resource assignment is required. Under this situation, the workflow in FIG. 4 may comprise a step of S031 after the step S03 and a step of S042 after the step S041. The step S031 is calculating an importance of weight for each sub-application regarding each sub-application related resource at time point T+1. The step S042 is if the assigned usable amount of the sub-application related resource in the at least one node at time point T+1 is not able to meet the need for the related sub-application, prioritize the need for the sub-application related resource for the sub-application with a larger importance of weight. The importance of weight is an average value of the second correlation value of any sub-application and the ratio of the sub-application relative to the main application in using the sub-application related resource at time point T. In order to better understand the calculation of importance of weight, please see FIG. 6 again. The import weight of each sub-application related resource in FIG. 6 is the average of the two columns on the left. The meaning of the importance of weight is to predict the possibilities of the sub-application related resource and its usage amount required by each sub-application at time point T+1. For the main application, a sub-application related resource of the sub-application with a more significant importance of weight should be fulfilled first in case of system errors occur in the main application. As shown in FIG. 6, if the usable amount of CPU core is not sufficient on time point T+1, the usage amount of the CPU core of the first sub-application should be fulfilled first (the importance of weight is 0.64). The next is the usage amount of the CPU core of the third sub-application (the importance of weight is 0.57). The usage amount of the CPU core of the second sub-application may not be sufficient, causing the performance of the second sub-application worse.

The above is a method for establishing a system resource prediction and resource management model considering correlations of three levels: workload of the main application, usage amount of the resource of the main application resource and usage amount of the resource of the sub-application. It is to assign nodes to the main application based on the workload of the main application, then further assigning the resources in the node to the sub-applications. However, according to the spirit of the present invention, it can also directly assign the resources to the sub-application if the workload of the main application is known. Please see FIG. 7 for related workflow.

In FIG. 7, a first step is in a node where a main application is deployed, regularly collecting workloads of the main application and usage amounts of every resource in the node used by the main application and a plurality of sub-applications thereof (S11), a second step is at time point T, predicting the workload of the main application at time point T+1 in the future with a time series model, and calculating ratios of each sub-application relative to the main application in using each resource in the node (S12). As mentioned above, the time series model can be but not restricted to the ARIMA model. It is also used for the same purpose. A third step is creating a predictive model to calculate usage amounts of every resource of the main application at every time point after time point T with usage amounts of every resource of the main application collected before time point T, and inputting the predicting workload of the main application at time point T+1 into the predictive model to obtain predicted usage amounts of every resource of the main application at T+1 time point (S13). A fourth step is assigning the predicted usage amounts of every resource of the main application to each sub-application according to the corresponding ratio at time point T+1 (S14). Obviously, the assigning method is to build a relationship between the usage amounts of each resource in the node of the sub-applications and the workload of the main application, so that the usage amounts of the resource can be assigned directly to the sub-applications by the result of prediction.

Although the above embodiments take a container as an example, in practice, the same method can also be applied to a virtual machine, and even a virtual machine which is used to establish a system resource prediction and resource management model for each container.

While the invention has been described in terms of what is presently considered to be the most practical and preferred embodiments, it is to be understood that the invention needs not to be limited to the disclosed embodiments. On the contrary, it is intended to cover various modifications and similar arrangements included within the spirit and scope of the appended claims, which are to be accorded with the broadest interpretation to encompass all such modifications and similar structures.

What is claimed is:

1. A method comprising:
   a) deploying and installing a main application on a plurality of nodes;
   b) collecting, at predetermined intervals, workloads of the main application and usage amounts of every resource in the plurality of nodes used by the main application and a plurality of sub-applications thereof, and synchronously calculating first correlation values of a respective amount of each resource used by the main application to execute the workloads of the main application and second correlation values of a respective amount of each resource used by each sub-application to execute the workloads;
   c) predicting the workload of the main application at time point T+1 in the future by a time series model at time point T, and determining the resource with a corresponding first correlation value higher than a first threshold value; and
   d) creating a usage amount predictive model to predict usage amounts of every resource of the main application at each time point after time point T with usage amounts of every resource of the main application collected before time point T and inputting the predicted workload of the main application at time point T+1 into the usage amount predictive model to obtain a predicted increment of the usage amount of the resource of the main application found in the previous step at time point T+1,
   wherein a calculating method of the first correlation value is calculating similarity measurement values with collected usage amounts of every resource of the main application and workloads of the main application, wherein when the similarity measurement value is negative, taking an absolute value thereof, wherein the similarity measurement value is obtained by calculating a cosine value from vectors formed by two change values of usage amounts of one single resource of the main application in three successive collecting time points and formed by two change values of workloads of the main application in three successive collecting time points.

2. The method according to claim 1, further comprising a step after the step d): e) assigning at least one additional node for the main application to use at time point T+1.

3. The method according to claim 2, further comprising a step of c1) after the step c) and a step of e1) after the step e):
   c1) determining corresponding sub-applications and sub-application related resources with a corresponding second correlation value higher than a second threshold value, and calculating ratios of said sub-applications relative to the main application using the sub-application related resource; and
   e1) assigning usable amounts of the sub-application related resource in the at least one node to the corresponding sub-application according to the corresponding ratio at time point T+1.

4. The method according to claim 3, wherein the second threshold value is 0.5.

5. The method according to claim 3, wherein a calculating method of the second correlation value comprises the steps of:
   calculating a similarity measurement value between the usage amount of one single resource the main application and that of any sub-application, a similarity measurement value between usage amounts of any two resources of the main application, and a similarity measurement value between usage amounts of any two sub-application resources with collected usage amounts of every resource of the main application and usage amounts of every resource of the sub-applications, wherein if the similarity measurement values are negative, taking an absolute value thereof, and wherein the similarity measurement value between usage amounts of a single resource of the main application or that of sub-application and itself is set to be 1; and
   averaging the similarity measurement values of the usage amounts of the single resource of the main application or that of the single sub-application.

6. The method according to claim 5, wherein the similarity measurement value is obtained by calculating a cosine value from vectors formed by two change values of usage amounts of the single resource of the main application in three successive collecting time points and formed by two change values of usage amounts of the single resource of any application in three successive collecting time points, vectors formed by two change values of usage amounts of any two resources of the main application in three successive collecting time points, or vectors formed by two change values of usage amounts of the single resource of any two applications in three successive collecting time points.

7. The method according to claim 3, further comprising a step of d1) after the step d) and a step of e2) after the step e1):
   d1) calculating an importance of weight for each sub-application regarding each sub-application related resource at time point T+1; and
   e2) if the assigned usable amount of the sub-application related resource in the at least one node at time point T+1 is not able to meet the need for the related sub-application, prioritize the need for the sub-application related resource for the sub-application with a larger importance of weight.

8. The method according to claim 7, wherein the importance of weight is an average value of the second correlation value of any sub-application and the ratio of the sub-application relative to the main application in using the sub-application related resource at time point T.

9. The method according to claim 1, wherein the first threshold value is 0.5.

10. The method according to claim 1, wherein the usage amount predictive model uses a machine-learning algorithm to analyze usage amounts of every resource of the main application collected before time point T to predict usage amounts of every resource of the main application at every time point after time point T.

11. The method according to claim 10, wherein the machine learning algorithm is a Regression Analysis algorithm, Bayesian Belief Network algorithm, Density-Based Spatial Clustering of Applications with Noise (DBSCAN) algorithm, Q-learning algorithm or Poly Regression algorithm.

12. The method according to claim 1, wherein the time series model is an Autoregressive Integrated Moving Average (ARIMA) model.

13. The method according to claim 1, wherein the resource is a number of usable CPU cores, usable memory, usable storage, or usable network bandwidth.

* * * * *